Patented Aug. 14, 1945

2,381,952

UNITED STATES PATENT OFFICE 2,381,952

STABILIZATION OF ORGANIC SUBSTANCES

Ivan Gubelmann, Wilmington, Del., assignor to E. I. du Pont de Nemours & Company, Wilmington, Del., a corporation of Delaware No Drawing. Application January 12, 1943, Serial No. 472,159

12 Claims. (Cl. 44—73)

This invention relates to the stabilization of organic substances and particularly to the stabilization of such substances which are subject to deterioration caused by the action of molecular oxygen and catalyzed by metals and their compounds.

Many organic products, such as fats, drying oils, rubber, petroleum products, photographic developers and synthetic unsaturated compounds, are readily attacked by oxygen and the resulting deterioration imparts undesirable qualities to them and eventually destroys their usefulness.

Signal success has been achieved in recent years, in the preservation of many organic substances, by the discovery and use of compounds generically called "oxidation inhibitors" or "antioxidants." These agents, mostly oxidizable organic compounds, retard the autocatalytic process. Since antioxidants are themselves oxidized in the course of time, as a result of autooxidation, the beneficial effect, obtained by their use, is not permanent and they protect the organic substances only so long as they are not rendered inactive. They are, moreover, very specific in action, each group of auto-oxidizable substances requiring a different type of antioxidant for the best results.

Vanadium, chromium, manganese, iron, cobalt, copper and their catalytically active compounds accelerate the rate of oxidation of many organic substances. For example, it is well known that copper compounds speed the formation of gum in cracked gasoline and the aging of rubber; that cobalt compounds promote the oxidation of drying oils; and that iron compounds catalyze the deterioration of lubricating oils. They also accelerate the oxidation of aromatic hydroxy and amino antioxidants, used to stabilize these oxidizable substances. Hence, these metal catalysts and the antioxidants are antagonistic in action, and the normal inhibiting effect of the latter is greatly reduced in the presence of the former.

Metal compounds occur naturally in many organic products, but often in such slight traces as to cause very little harm. Their concentrations, however, are frequently raised during the course of handling and utilizing the products; vessels and conduits, made of metals containing copper or iron, are used for storage and transportation, or ingredients, contaminated with metal compounds, might be added.

The harm done by these extraneous catalysts may be prevented by at least three methods: (1) their removal by purification, but often this is practically impossible of accomplishment and usually too costly to be economically feasible, (2) the addition of a sufficient amount of an antioxidant so that its preserving effect is equal to or greater than the pro-oxidant effects of the metal catalysts present, but the effectiveness of the antioxidant is so greatly diminished by the metal catalysts that the advantage gained under this circumstance is seldom worth the cost of the increased quantity of antioxidant required for adequate stabilization, and (3) the suppression of the catalytic activity of the metal compounds by chemical means without physically removing them from the system.

It is an object of the present invention to retard the deterioration of organic substances caused by the action of molecular oxygen and promoted by the presence of certain metal catalysts and their catalytically active compounds. Another object is to render antioxidants, which are relatively ineffective in the presence of metal catalysts and their catalytically active compounds, effective to inhibit the oxidation of oxidizable organic substances even in the presence of metal catalysts and their catalytically active compounds. A further object is to provide a new class of metal deactivators which are effective to render metal catalysts inactive to catalyze the oxidation of oxidizable organic substances containing or in contact with such metal catalysts. A more particular object is to inhibit the deterioration of petroleum hydrocarbons in the presence of metal catalysts and their catalytically active compounds. Other objects are to provide new compositions of matter and to advance the art. Still other objects will appear hereinafter.

The above and other objects may be accomplished in accordance with my invention which comprises adding to organic substances, normally subject to deterioration caused by the action of molecular oxygen, and containing a catalyst of the group consisting of vanadium, chromium, manganese, iron, cobalt, copper and their compounds, normally effective to catalyze oxidation of said organic substances, a metal deactivator in a small proportion sufficient to deactivate such catalyst, such metal deactivator being identical with the compound obtained by condensing one mole of an ortho-hydroxy substituted aldehyde, aromatic in nature, with one mole of a primary monoamino polyhydric alcohol. The organic substance also may, and generally will, contain an antioxidant which is normally effective to retard oxidation of the organic substance in the absence of the metal catalyst. I have found that such metal deactivators are capable of effectively suppressing the catalytic activity of vanadium, chromium, manganese, iron, cobalt, copper and their catalytically active compounds and hence will render such catalysts ineffective to catalyze the oxidation of the organic substance, including any antioxidant which may be present.

The organic substances, which may be treated in accordance with my invention, include animal and vegetable fats and oils, edible oils, fruit and vegetable juices, textile fibres, photographic developers, antioxidants, synthetic unsaturated compounds, petroleum hydrocarbons, rubber and the like. My metal deactivators are particularly desirable in liquid petroleum hydrocarbons and especially in gum-forming hydrocarbon distillates, such as, for example, cracked gasoline. Generally, in practice, the organic substance, particularly the petroleum hydrocarbons, will also contain an antioxidant which is normally effective to materially retard the deterioration or oxidation of the organic substance in the absence of the catalytically active metals, but which is less effective in the presence of such metals.

The metal deactivators of my invention are new chemical compounds, and may be prepared by reacting one mole of an ortho-hydroxy substituted aldehyde, aromatic in nature, with a primary monoamino polyhydric alcohol in equal molecular proportions and generally in an inert solvent. I believe that quite probably the aldehyde reacts with the amino group of the amino alcohol to form a Schiff's base type of compound represented by the formula

HO—R—CH=N—R' wherein R represents a divalent organic radical, aromatic in nature, whose two valences are on adjacent ring carbon atoms and R' represents a polyhydroxy substituted aliphatic radical. However, I do not wish to be limited to any theory as to the structural formula of the compounds.

By an "ortho-hydroxy substituted aldehyde," I mean one in which the hydroxy group and the aldehyde, or —CHO, group are directly bonded to adjacent ring carbon atoms. By the term "aldehyde, aromatic in nature," I intend to include the unsaturated cyclic aldehydes, such as the pyridine and quinoline aldehydes which have many of the characteristic properties of the aromatic aldehydes, as well as the strictly aromatic aldehydes in which the hydroxy and aldehyde groups are bonded to ring carbon atoms of a benzene ring.

The aldehyde is preferably an aromatic aldehyde and may contain as substituents hydroxy, alkyl, aryl, alkoxy, aryloxy, halogen, heterocyclic, amino, cyano, carboxyl, sulfonic and like groups. However, I particularly prefer the ortho-hydroxy substituted aryl aldehydes which are aromatic aldehydes which, except for the hydroxy and aldehyde groups, consist of carbon and hydrogen. Also, I particularly prefer the ortho- hydroxy aromatic and ortho-hydroxy aryl aldehydes of the benzene series, by which I mean those which contain one benzene ring and no other cyclic rings. I especially prefer compounds derived from salicylaldehyde.

By a "primary monoamino polyhydric alcohol," I mean an alcohol which contains only one amino group, which amino group must be a primary amino group, and at least 2 hydroxy groups. While the amino alcohols, which contain only one hydroxy group, have some effect, I have found that those, which contain a plurality of hydroxy group, are much more effective. I prefer that the amino alcohols be those which, except for the amino and hydroxy groups, consist of carbon and hydrogen. I particularly prefer that the amino alcohol be a sugar amine which contains a single primary amino group. By "sugar amines," I mean the amines of reducing sugars of 5 or more carbon atoms. Such sugar amines may be considered to be amino alcohols of 5 or more carbon atoms with a hydroxy group on each carbon other than that which is attached to the nitrogen. The preferred sugar amine is glucamine which is the primary monoamino derived from glucose.

Definite operative concentrations of the metal deactivator in the organic substance cannot be specified for each case as the quantity required is dependent upon the amount of metal catalyst present in the organic substance. The metal deactivator should be present in the proportion of approximately 5 to 50 times the amount of the metal catalyst present, on the basis of the metallic element, in order to obtain complete deactivation of the metal catalyst. Higher proportions of metal deactivator may be employed, particularly when a reservoir of metal is present in the form of metal in bulk in contact with the organic substance. Generally, from about 0.001% to about 0.1%, based on the weight of the organic substance, will be sufficient for most purposes, particularly when the organic substance is a liquid petroleum hydrocarbon, such as a gum-forming hydrocarbon distillate of the character of cracked gasoline. In rubber, about 0.1% to about 1.0% will generally be employed.

The catalytically active metal and its compounds may be dissolved in the organic substance or suspended therein or may be in the form of metal in bulk in intimate contact with the organic substance. It will be understood that, when I refer to an organic substance containing a catalyst, I mean to include those cases wherein the metal in bulk form is in contact with the organic substance, as well as those cases wherein the catalytically active metal is dissolved or suspended in the organic substance.

The deactivators may be added to the oxidizable organic substances to be protected in any form and manner. They may be in solid or liquid form, mixed with other additional agents or dissolved in a solvent. They may be dissolved in the organic substance or dispersed therein in any suitable manner. They may be added to the finished organic substance or to the organic substance at any stage in its manufacture.

In order to avoid confusion arising from a superabundance of data, gasoline has been selected as an example of an auto-oxidizable organic substance for the purposes of illustration. The samples of gasoline used in the following tests were either cracked gasolines or blends of cracked and straight-run gasolines, completely refined, but otherwise untreated with chemical agents, such as dyes, anti-knocks and antioxidants. Since gasoline is a mixture of variable composition, identical results are not obtained with different samples. The magnitude of the effects is great enough, however, to render this difference relatively insignificant.

p-Benzylaminophenol, abbreviated BAP, has been chosen as a representative gasoline antioxidant. The concentrations of the antioxidants and the metal deactivators are given in weight percent in gasoline. The concentrations of the metals are given in parts per million by weight of the metal, abbreviated P. P. M., rather than by weight of the metal compound.

The term "stabilized gasoline" is employed to denote gasoline to which has been added an antioxidant in sufficient quantity to significantly increase its induction period in the absence of added metal catalysts.

The accelerated method, used for determining the induction periods given below, was the one described in J. I. E. C. 25, 397 (1933). It consists in heating 100 cc. of gasoline at 100° C. in a 1 liter Pyrex flask containing pure oxygen. The internal pressure is observed every 10 minutes by means of a manometer attached to the system. The elapsed time, from the start of the test until the gasoline begins to absorb oxygen at the rate of 10 cc. per 10 minutes or higher, as shown by the fall in internal pressure, is taken as the induction period. It has been found that the induction period, obtained by this method, although greatly shortened, is a fairly accurate measure of the relative stability of gasoline under normal storage conditions.

Table I

Induction period of control, 100 minutes.
This gasoline, containing 0.0015% BAP and having an induction period of 300 minutes in the absence of copper, was used for these tests.

| Area of metallic copper surface, sq. in. | Induction period in minutes | |
|---|---|---|
| | No deactivator. | +0.01% salicylal-beta-hydroxy-ethylamine. |
| 0.5 | 70 | 160 |

It will be noted that the above compound counteracts, only partially, the effect of copper.

Table II

Induction period of control, 80 minutes.
This gasoline, containing 0.001% BAP and having an induction period of 210 minutes in the absence of copper, was used for these tests.

| Area of metallic copper surface | Induction period in minutes | |
|---|---|---|
| | No deactivator | +0.002% salicylal glucamine |
| 0.5 | 80 | 320 |

It will be observed that the catalytic effect of metallic copper is not only completely suppressed by salicylal glucamine, but the induction period is increased beyond 210 minutes to 320 minutes. This is thought to be due to the catalytic metals already present in the gasoline. It is also seen, by comparing the data in Tables I and II, that a polyhydroxylated amine forms a more effective deactivator than a monohydroxylated amine.

Copper is one of the most potent catalysts for the oxidation of many organic products. It is the most powerful and one of the commonest metal contaminants in gasoline. Other metals, however, possess different degrees of catalytic activity.

The action of certain catalysts on stabilized gasoline and the effect of salicylal glucamine on their activity are shown in Table III.

Table III

Induction period of control, 130 minutes.
This gasoline, containing 0.0025% p-(n-butylamino) phenol and having an induction period of 390 minutes in the absence of metal catalysts, was used for the tests the results of which are presented below.

| No. | Metal catalyst [1] | Conc., P. P. M. | Induction period in minutes | |
|---|---|---|---|---|
| | | | Absence of deactivator | Presence of 0.005% salicylal glucamine |
| 1 | Chromium | 0.81 | 360 | 380 |
| 2 | Manganese | .86 | 245 | 355 |
| 3 | Iron | .87 | 320 | 385 |
| 4 | Cobalt | .92 | 215 | 360 |

[1] The metal catalysts were added as the oleates.

It will be noted that chromium, manganese, iron and cobalt shorten the induction period of gasoline stabilized with p-(n-butylamino) phenol, and that salicylal glucamine counteracts the action of all these metals.

The deactivators are also effective in decreasing the copper dish gum in gasoline, whether used alone or in combination with an antioxidant. This is shown by the data in Table IV.

Table IV

| No. | Conc. BAP, wt. percent | Conc. salicylal glucamine, wt. percent | Copper dish gum, mg./100 cc. |
|---|---|---|---|
| 1 | 0.0 | 0.0 | 67 |
| 2 | 0.001 | 0.0 | 55 |
| 3 | 0.001 | 0.0025 | 36 |
| 4 | 0.001 | 0.005 | 26 |

It has long been recognized that small traces of copper have a very pronounced catalytic effect on the oxidation of rubber. In order to overcome this difficulty, it has been necessary to establish rigorous specifications for the copper content of compounding agents used in rubber. In many cases, particularly with dyes, the removal of traces of copper is both troublesome and expensive.

In general, the common antioxidants, used in rubber, are unable to suppress the catalytic action of copper. The metal deactivators, however, have been found to be effective for this purpose.

Since salicylal glucamine is not an antioxidant it was tested in stock containing 1% of phenyl-beta-naphthylamine as an added antioxidant. The bomb physical test was used as a method of evaluation. The following stock was used in the tests, wherein the parts are by weight.

| | |
|---|---|
| Rubber | 100 |
| Zinc oxide | 100 |
| Sulfur | 3 |
| Stearic acid | 1 |
| Lithopone | 20 |
| Di-o-tolyl guanidine | 0.75 |
| Phenyl-beta-naphthylamine | 1.0 |
| Copper stearate | 0.05 |

The stock was cured for 45 minutes at 40 pounds steam pressure. The results of the tests are given in Table V.

Table V

| No. | Days at 70° C. and 300 lbs. oxygen | No deactivator tensile lbs. sq. in. | Percent el. | 0.5% salicylal glucamine ||
|---|---|---|---|---|---|
| | | | | Tensile lbs./sq. in. | Elongation percent |
| 1 | 0 | 3,500 | 650 | 3,350 | 650 |
| 2 | 2 | 1,525 | 600 | 3,000 | 630 |
| 3 | 5 | (1) | | 2,400 | 610 |
| 4 | 7 | | | 1,975 | 555 |
| 5 | 9 | | | 1,625 | 480 |
| 6 | 12 | | | 1,275 | 455 |
| 7 | 14 | | | 1,025 | 420 |
| 8 | 16 | | | 975 | 410 |
| 9 | 19 | | | 800 | 370 |
| 10 | 21 | | | 750 | 300 |

¹ Melted off.

The deactivators, belonging to the class of compounds of my invention, are readily prepared by reacting equimolar proportions of ortho-hydroxy aromatic aldehydes and hydroxyamines, in a suitable solvent if necessary.

One method of preparing salicylal glucamine is as follows: An aqueous solution of 36 parts of glucamine (NH₂—CH₂—CHOH—CHOH—
            CHOH—CHOH—CH₂OH)

was mixed with 24 parts of salicylaldehyde and evaporated on a steam bath until the reaction mixture had become a paste. Bright yellow crystals were obtained by adding methanol to the reaction mixture. The crystals were filtered and dried. They melted at 181–2° C. and contained 4.9% nitrogen by weight.

It is thought that the following reaction occurred.

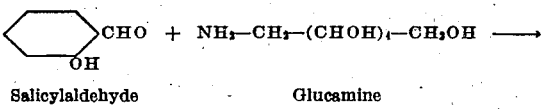

Salicylaldehyde        Glucamine

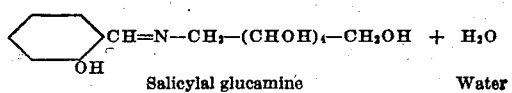

Salicylal glucamine        Water

Most of these deactivators are yellow compounds which are hydrolyzed by mineral acids.

In order to obtain the best results, the deactivators must be soluble in the products to be protected.

Since many of these deactivators, particularly the condensation products of the polyhydroxyamines, are water soluble, they are especially useful in stabilizing systems containing considerable proportions of water, such as aqueous solutions, suspensions and emulsions.

It will be understood that the experiments and tests, hereinbefore given, have been given for illustrative purposes only. Many variations and modifications can be made in my invention without departing from the spirit or scope thereof. The metal deactivators of my invention can be employed in other organic substances, the metals may be present in other forms and other compounds, within the broad scope of my invention, may be substituted for the compounds specifically referred to hereinbefore. While I have disclosed the use of single metal deactivators, it will be apparent that mixtures of two or more metal deactivators of my invention may be employed if desired.

Besides many others the condensation products of the following aldehydes with the following hydroxyamines are metal deactivators.

Aldehydes 2-hydroxy-benzaldehyde
2-hydroxy-5-chlorobenzaldehyde
2-hydroxy-3,5-dibromobenzaldehyde
2-hydroxy-3-nitrobenzaldehyde
2-hydroxy-6-methylbenzaldehyde
2-hydroxy-5-ter-butylbenzaldehyde
2-hydroxy-3-methoxybenzaldehyde
2,4-dihydroxybenzaldehyde
2-hydroxynaphthaldehyde-1
1-hydroxynaphthaldehyde-2
Anthrol-2-aldehyde-1
2-hydroxyfluorene-aldehyde-1
4-hydroxydiphenylaldehyde-3
3-hydroxyphenanthrene-aldehyde-4

Hydroxyamines 3-aminopropanediol-1,2
2-amino-2-methylpropanediol-1,3
2-amino-2-methylolpropanediol-1,3
5-amino-1,2,3,4-tetrahydroxypentane
2-amino-1,1,1-trimethylolethane
Arabinamine
Xylamine
Mannamine
Galactamine
Glucamine
Fructamine
Ribamine
Lyxamine
Lactamine
Rhamnamine
Sorbinamine
Sorbamine
Gulamine
Talamine It will be apparent that, by my invention, I am able to effect the stabilization of organic substances susceptible to the harmful action of molecular oxygen catalyzed by vanadium, chromium, manganese, iron, cobalt, copper and their catalytically active compounds. This stabilization may be accomplished, in accordance with my invention, by the addition of metal deactivators, either alone or in combination with an amount of an antioxidant sufficient to stabilize the substance in the absence of metal catalysts. It is often technically and economically unfeasible to counteract the catalytic effects of such metals by means of an antioxidant alone. I believe that the metal deactivators of my invention function by forming very stable complexes with the metals, which complexes are catalytically inactive. It appears that the metal deactivators of my invention, in general, are not antioxidants. However, my invention is not to be limited by any theory as to the manner in which the metal deactivators function to produce the results.

I claim:

1. A composition comprising an organic substance, normally subject to deterioration caused by the action of molecular oxygen, containing a catalyst of the group consisting of vanadium, chromium, manganese, iron, cobalt, copper and their compounds, normally effective to catalyze oxidation of said organic substance, and having incorporated therein a metal deactivator in a small proportion sufficient to deactivate said catalyst, said metal deactivator being identical with the compound obtained by condensing 1 mole of an ortho-hydroxy substituted aromatic aldehyde with 1 mole of a sugar amine containing a single primary amino group.

2. A composition comprising an organic substance, normally subject to deterioration caused by the action of molecular oxygen, containing a catalyst of the group consisting of vanadium, chromium, manganese, iron, cobalt, copper and their compounds, normally effective to catalyze oxidation of said organic substance, and having incorporated therein a metal deactivator in a small proportion sufficient to deactivate said catalyst, said metal deactivator being identical with the compound obtained by condensing 1 mole of an ortho-hydroxy substituted aromatic aldehyde of the benzene series with 1 mole of a sugar amine containing a single primary amino group.

3. A composition comprising an organic substance, normally subject to deterioration caused by the action of molecular oxygen, containing a catalyst of the group consisting of vanadium, chromium, manganese, iron, cobalt, copper and their compounds, normally effective to catalyze oxidation of said organic substance, and having incorporated therein a metal deactivator in a small proportion sufficient to deactivate said catalyst, said metal deactivator being identical with the compound obtained by condensing 1 mole of an ortho-hydroxy substituted aryl aldehyde of the benzene series with 1 mole of a sugar amine containing a single primary amino group.

4. A composition comprising an organic substance, normally subject to deterioration caused by the action of molecular oxygen, containing a catalyst of the group consisting of vanadium, chromium, manganese, iron, cobalt, copper and their compounds, normally effective to catalyze oxidation of said organic substance, and having incorporated therein a metal deactivator in a small proportion sufficient to deactivate said catalyst, said metal deactivator being identical with the compound obtained by condensing 1 mole of salicylaldehyde with 1 mole of a sugar amine containing a single primary amino group.

5. A composition comprising an organic substance, normally subject to deterioration caused by the action of molecular oxygen, containing a catalyst of the group consisting of vanadium, chromium, manganese, iron, cobalt, copper and their compounds, normally effective to catalyze oxidation of said organic substance, and having incorporated therein a metal deactivator in a small proportion sufficient to deactivate said catalyst, said metal deactivator being identical with the compound obtained by condensing 1 mole of an ortho-hydroxy substituted aromatic aldehyde of the benzene series with 1 mole of glucamine.

6. A composition comprising an organic substance, normally subject to deterioration caused by the action of molecular oxygen, containing a catalyst of the group consisting of vanadium, chromium, manganese, iron, cobalt, copper and their compounds, normally effective to catalyze oxidation of said organic substance, and having incorporated therein a metal deactivator in a small proportion sufficient to deactivate said catalyst, said metal deactivator being identical with the compound obtained by condensing 1 mole of salicylaldehyde with 1 mole of glucamine.

7. A composition comprising an organic substance, normally subject to deterioration caused by the action of molecular oxygen, containing a catalyst of the group consisting of vanadium, chromium, manganese, iron, cobalt, copper and their compounds, normally effective to catalyze oxidation of said organic substance, and a small proportions of an antioxidant, normally effective to materially retard such deterioration in the absence of said catalyst but which is less effective in the presence of said catalyst, and having incorporated therein a metal deactivator in a small proportion sufficient to deactivate said catalyst, said metal deactivator being identical with the ompound obtained by condensing 1 mole of an ortho-hydroxy substituted aromatic aldehyde with 1 mole of a sugar amine containing a single primary amino group.

8. A composition comprising an organic substance, normally subject to deterioration caused by the action of molecular oxygen, containing a catalyst of the group consisting of vanadium, chromium, manganese, iron, cobalt, copper and their compounds, normally effective to catalyze oxidation of said organic substance, and a small proportion of an antioxidant, normally effective to materially retard such deterioration in the absence of said catalyst but which is less effective in the presence of said catalyst, and having incorporated therein a metal deactivator in a small proportion sufficient to deactivate said catalyst, said metal deactivator being identical with the compound obtained by condensing 1 mole of an ortho-hydroxy substituted aryl aldehyde of the benzene series with 1 mole of a sugar amine containing a single primary amino group.

9. A composition comprising an organic substance, normally subject to deterioration caused by the action of molecular oxygen, containing a catalyst of the group consisting of vanadium, chromium, manganese, iron, cobalt, copper and their compounds, normally effective to catalyze oxidation of said organic substance, and a small proportion of an antioxidant, normally effective to materally retard such deterioration in the absence of said catalyst but which is less effective in the presence of said catalyst, and having incorporated therein a metal deactivator in a small proportion sufficient to deactivate said catalyst, said metal deactivator being identical with the compound obtained by condensing 1 mole of salicylaldehyde with 1 mole of glucamine.

10. A composition comprising petroleum hydrocarbons, normally subject to deterioration caused by the action of molecular oxygen, containing a catalyst of the group consisting of vanaduim, chromium, manganese, iron, cobalt, copper and their compounds, normally effective to catalyze oxidation of said petroleum hydrocarbons, and having incorporated therein a metal deactivator in a small proportion sufficent to deactivate said catalyst, said metal deactivator being identical with the compound obtained by condensing 1 mole of an ortho-hydroxy substituted aromatic aldehyde with 1 mole of a sugar amine containing a single primary amino group. .

11. A composition comprising petroleum hydrocarbons, normally subject to deterioration caused by the action of molecular oxygen, containing a catalyst of the group consisting of vanadium, chromium, manganese, iron, cobalt, copper and their compounds, normally effective to catalyze oxidation of said petroleum hydrocarbons, and a small proportion of an antioxidant, normally effective to materially retard such deterioration in the absence of said catalyst but which is less effective in the presence of said catalyst, and having incorporated therein a metal deactivator in a small proportion sufficient to deactivate said catalyst, said metal deactivator being identical with the compound obtained by condensing 1 mole of an ortho-hydroxy substituted aromatic aldehyde with 1 mole of a sugar amine containing a single primary amino group.

12. A composition comprising gasoline, normally subject to deterioration caused by the action of molecular oxygen, containing a catalyst of the group consisting of vanadium, chromium, manganese, iron, cobalt, copper and their compounds, normally effective to catalyze oxidation of said gasoline, and a small proportion of an antioxidant, normally effective to materially retard such deterioration in the absence of said catalyst but which is less effective in the presence of said catalyst, and having incorporated therein a metal deactivator in a small proportion sufficient to deactivate said catalyst, said metal deactivator being identical with the compound obtained by condensing 1 mole of an ortho-hydroxy substituted aromatic aldehyde with 1 mole of a sugar amine containing a single primary amino group.

IVAN GUBELMANN.